US011394738B2

(12) United States Patent
Kulaga et al.

(10) Patent No.: US 11,394,738 B2
(45) Date of Patent: Jul. 19, 2022

(54) SYSTEM AND METHOD FOR CREATING A DATA PROTECTION MAP AND REMEDIATING VULNERABILITIES

(71) Applicant: Acronis International GmbH, Schaffhausen (CH)

(72) Inventors: Andrey Kulaga, Moscow (RU); Vladimir Strogov, Moscow (RU); Oleg Ishanov, Moscow (RU); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 365 days.

(21) Appl. No.: 16/747,609

(22) Filed: Jan. 21, 2020

(65) Prior Publication Data

US 2020/0274895 A1 Aug. 27, 2020

Related U.S. Application Data

(60) Provisional application No. 62/809,783, filed on Feb. 25, 2019.

(51) Int. Cl.
*H04L 9/40* (2022.01)
*G06N 20/00* (2019.01)
*G06F 16/28* (2019.01)

(52) U.S. Cl.
CPC ........ *H04L 63/1433* (2013.01); *G06F 16/285* (2019.01); *G06N 20/00* (2019.01); *H04L 63/1425* (2013.01); *H04L 63/20* (2013.01)

(58) Field of Classification Search
CPC . H04L 63/1433; H04L 63/1425; H04L 63/20; G06F 16/285; G06F 16/906; G06N 20/00
See application file for complete search history.

(56) References Cited

U.S. PATENT DOCUMENTS

| 10,452,993 | B1 * | 10/2019 | Hart ........................ G06N 7/005 |
| 11,017,117 | B2 * | 5/2021 | Carrier .................. G06F 40/117 |
| 11,150,974 | B2 * | 10/2021 | Velipasaoglu ...... G06F 11/0787 |
| 2020/0274895 | A1 * | 8/2020 | Kulaga ............... H04L 63/1433 |
| 2021/0264025 | A1 * | 8/2021 | Givental ............... G06F 21/577 |

* cited by examiner

*Primary Examiner* — Beemnet W Dada
(74) *Attorney, Agent, or Firm* — ArentFox Schiff LLP; Michael Fainberg (57) ABSTRACT

Systems and methods for remediating vulnerabilities on a plurality of computing devices is disclosed herein. In one exemplary aspect, a method comprises classifying monitored data into a plurality of categories using a machine learning algorithm. For each respective data file of the monitored data, the method comprises retrieving one or more policies associated with a classified category of the respective data file and determining whether respective data file complies with the one or more policies. The method further comprises generating a compliance map based on compliance with policies for each respective data file of the monitored data, wherein the compliance map indicates vulnerabilities in the plurality of computing devices, determining whether the vulnerabilities are actionable, and in response to determining the vulnerabilities are actionable, requesting actions to be performed on the plurality of devices to remediate the vulnerabilities and non-compliance.

18 Claims, 7 Drawing Sheets

Report 114

| ADDRESS | SUBNET | MACHINE | Time | Data | Data Type | Violation(s) |
|---|---|---|---|---|---|---|
| ... | ... | PC_123 | 12/1/2018 | MRI Scan | Medical File | Stored in an unsecure location |

SYSTEM AND METHOD FOR CREATING A DATA PROTECTION MAP AND REMEDIATING VULNERABILITIES

CROSS-REFERENCE TO RELATED APPLICATIONS

This application claims benefit of priority to U.S. Provisional Patent Application No. 62/809,783 filed on Feb. 25, 2019, which is herein incorporated by reference in its entirety.

FIELD OF TECHNOLOGY

The present disclosure relates generally to the field of data storage, and more specifically, to systems and method for creating a data protection map and remediating vulnerabilities.

BACKGROUND

Data storage facilities are regulated by a complex body of laws relating to privacy as well as specific industrial sectors of commerce. These laws may require storage facilities to comply with particularly safety and confidentiality standards. Often implementing compliance strategies across the enterprise becomes a difficult and piece-meal task, leading to undesirable violations of regulations and possible data leaks. Furthermore, storing corporate data is a sensitive operation that must protect the data from unauthorized access and unauthorized use by employees to avoid intellectual property infringement and other undesirable outcomes.

There is a need, then, for a solution that collects all information relevant to standards for data storage across an enterprise according to predefined rules and to provide recommendations on how and what to fix.

SUMMARY

Aspects of the disclosure relate to the field of data storage. In particular, aspects of the disclosure describe methods and systems for remediating vulnerabilities on a plurality of computing devices. In one exemplary aspect, the method comprises monitoring data associated with the plurality of computing devices and classifying the monitored data into a plurality of categories using a machine learning algorithm configured to assign a category for a data file based on characteristics of the data file. For each respective data file of the monitored data, the method comprises evaluating compliance by retrieving one or more policies associated with a respective category of the respective data file and determining whether respective data file complies with the one or more policies. The method further comprises generating a compliance map based on the compliance with policies for each respective data file of the monitored data (wherein the compliance map indicates the vulnerabilities on the plurality of computing devices), determining whether the vulnerabilities indicated in the compliance map are actionable, and in response to determining the vulnerabilities are actionable, requesting actions to be performed on the plurality of devices to remediate the vulnerabilities and non-compliance.

In one aspect, determining whether the vulnerabilities are actionable comprises determining that the vulnerabilities can be corrected using automated processes executed on a computing device.

In one aspect, the actions to be performed on the plurality of devices comprise one or more of moving data to a secure storage area, changing access rights to data and making an urgent backup of data.

In one aspect, classifying the data comprises grouping the data into categories based on one of a file type of the data, content of the data, and a logical grouping of the data.

In one aspect, the method further comprises generating an audit log during monitoring of the data associated with the plurality of computing devices, generating a report of compliance of the data based on the audit log, and generating the compliance map based on the report.

In one aspect, the method further comprises displaying the compliance map to an end user, detecting end user input on the compliance map, determining that the end user input has selected a portion of the plurality of computing devices by determining if the end user input coincides with a visual depiction of the portion of the plurality of computing devices, and providing detailed information regarding compliance of the portion of the plurality of the computing devices.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for creating a data protection map and remediating vulnerabilities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
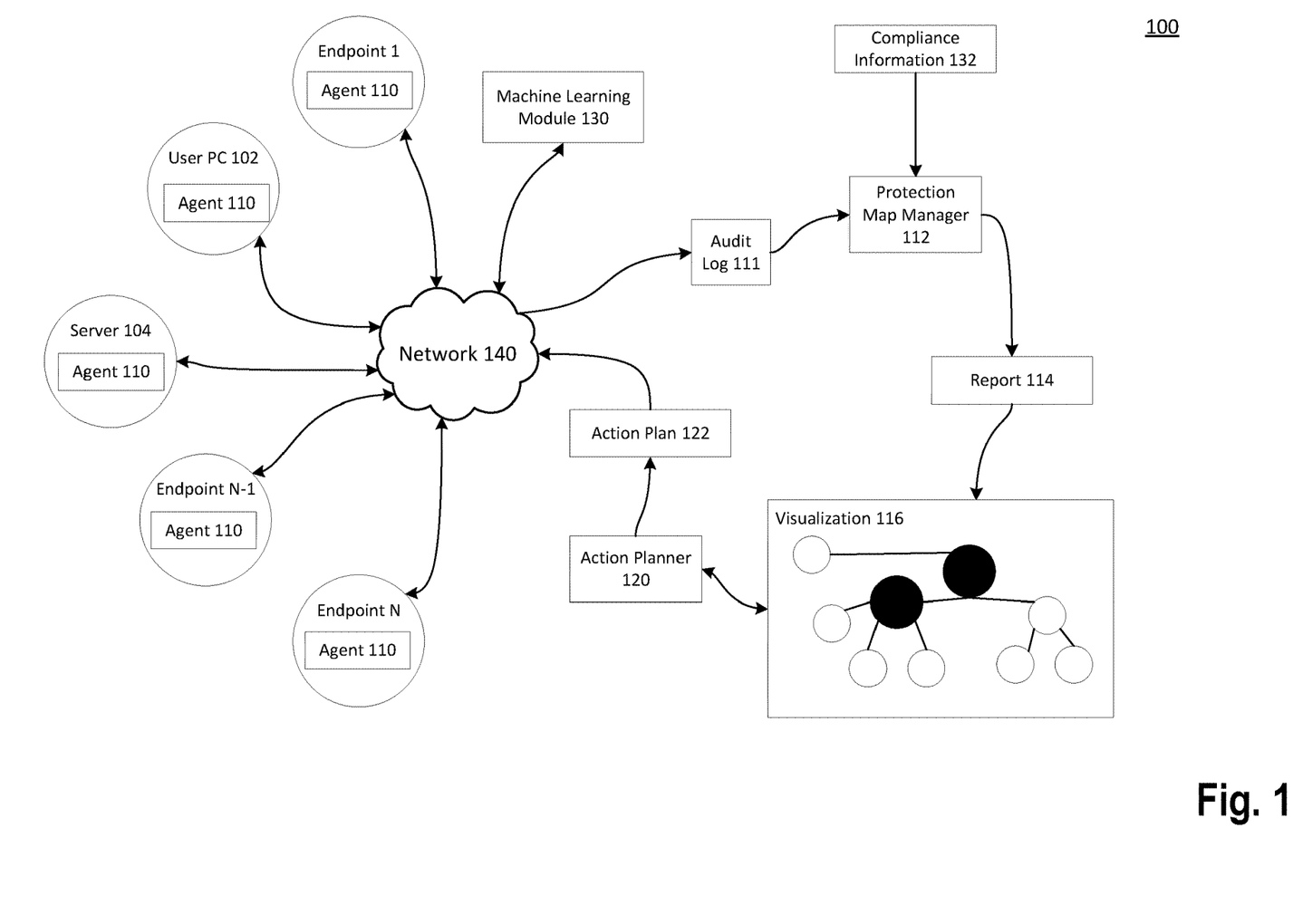
FIG. 1 is a block diagram illustrating a system for vulnerability remediation, in accordance with exemplary aspects of the present disclosure.

FIG. 1 is a block diagram illustrating a system 100 for vulnerability remediation, in accordance with exemplary aspects of the present disclosure.

The system 100 comprises a plurality of computing devices (used interchangeably with endpoints 1-N), a machine learning module 130, a protection map manager 112 and an action planner 120. In exemplary aspects of the present disclosure, each of the components of the system 100 assist in providing a complete solution for determining security vulnerabilities across an organization and remediating these vulnerabilities. The organization may seek to adhere to certain internal practices of securing internal data, and/or may seek to comply with external regulations imposed on them to secure internal and/or private data, such as standards of confidentiality and the like. The system 100 makes this task significantly easier by identifying data being used by each of the computing devices and determining whether they violate various policies or not. The system 100 then may recommend actions to be taken to eliminate violations and vulnerabilities and to prevent them in the future. In some aspects, the system 100 may perform the actions or request that the endpoints perform the remedial actions.

In this aspect, the plurality of computing devices, or endpoints 1-N, may be located together, across a wired or wireless network, or a mixture of both. Each of the endpoints 1-N have an agent 110 installed. The agent 110 scans and monitors data local to the endpoint and may communicate with the machine learning module 130 in order to more easily classify data over time into different categories. The endpoints 1-N may include, for example, a user PC 102 and a server 104 in addition to other file storage facilities of an organization, common across enterprise networks, e.g., network 140.

In exemplary aspects, the agent 110 scans the contents of all files as specified by an administrator of the system 100 and records such scanning events into the audit log 111. The audit log 111 keeps a record of each scan including information about which device produced a particular file, when the file was scanned, the type of the file in terms of logical type as well as data type, and other important file information. In exemplary aspects, the audit log 111 collects any events and/or facts, some of them neutral and unimportant and some of them impacting the final visualization and report. The protection map manager 112 compares the file access permissions of each file and the content against various policies implemented by the system administrator to determine whether there is a possibility of publication and/or leakage of personal data or other confidential information that may be critical for an organization. In some aspects, the protection map manager 112 generates a report 114 detailing the compliance throughout various branches of the organization as related to particular security and confidentiality policies. The report 114 is shown in more detail in FIG. 4, and may include an address where a file was scanned, the subnet where the file was scanned, other network information relating to the device where the file was scanned, the machine name and ID, the time of the scan, the file type, the data type an access policy rights. In some aspects, more information may be included that can help determine whether the enterprise or portions of the enterprise devices are compliant with standards or policies. The report summarizes the information from audit log 111, for example, "Everything is OK, except A, B, and C . . . ", giving an assessment in terms of internal safety rules or other rules (for example, external ones like the GDPR.

In some aspects, the protection map manager 112 may also generate a viewable visualization 116 of the compliance across the enterprise, based on a transformation of the data found in report 114, as compared to external policy, regulation and standards information (i.e., compliance information 132). The visualization 116 is a visualization of a formalized report on the status of all file storage facilities of an organization in terms of compliance with rules and policies for storage of existing standards and in terms of compliance with safety and confidentiality standards. The visualization 116 may also be referred to as a protection map that shows how data is being protected across storage facilities and other devices across the organization.

The rules can include the list of files, computers or persons that should be watched. The rules can identify a list of dedicated storage devices, folders, or the like, the access to which should be monitored in terms of who accessed them, what files and/or documents were transferred, moved, copied or the like. Also the rules can include the description of access permissions for different types of content e.g.: read only, immutable, prohibit to copy, to move, to send by email etc. In other words, the rules typically can be based on internal security policy, but it can be significantly more detailed and may be formalized and have a computer readable format. For example, the groups in these rules do not necessarily match with the groups in a corporate network (such as Active Directory).

The visualization 116 may comprise a collection or listing of file storages (e.g., hard drives on endpoints 1-N) and descriptions of which files with sensitive information are in the repository and what the violations are, e.g.: in terms of violations of the laws of the country (compliance, e.g. the European Union General Data Protection Regulation, or GDPR), from the point of view of secrecy of corporate information—a list of information (hashes) is revealed—according to the degree of similarity (recognition of documents with similar blocks, rearranged, modified) based on document sample and vectors, e.g. hashes or lines (for text or binary), or the like. In some aspects, the binary files (like the MS Office documents) are divided into blocks, and if an array appears, the blocks must have been rearranged, so the visualization 116 reports similarity of the docs. In some aspects, textual documents are compared on the lines level. Ultimately, the protection map manager 112 calculates the places in which there are poorly protected files with open access and compliance violations. In exemplary aspects, the visualization is an optional and more convenient method of providing a "big picture" of storage infrastructure compliance with rules. The visualization 116 is merely a single embodiment of the protection map, and other embodiments are contemplated.

The protection map (e.g., visualization 116) is a "snapshot" of a company security, safety and compliance state at a particular moment. This gives a clear and visible picture of what problems exist in terms of compliance with safety standards and compliance of the stored data (documents)

with the established rules and legal requirements. The protection map can exist in any forms—visual, descriptive, digital, etc.

Based on this protection map, the protection map manager 112 may request that the action planner 120 generate an action plan 122 that can be applied to the organization's devices. In some aspects, the action plan 122 may describe relocation of files, enablement of security such as firewalls or the like, modification of server parameters, encryption protocols to apply to file categories, and the like. Those of ordinary skill in the art will recognize that the action plan 122 may include other remediating actions as well that solve or prevent vulnerabilities or address compliance violations. Remedial actions may also include moving documents to a secure storage area, changing access rights to documents, making an urgent backup, for example using backup agents on each endpoint 1-N, or the like. The recommendations may be implemented as Service Level Agreements (SLAB) or in any other form that allows the automation of processors or actions on computing devices.

Figure 2:
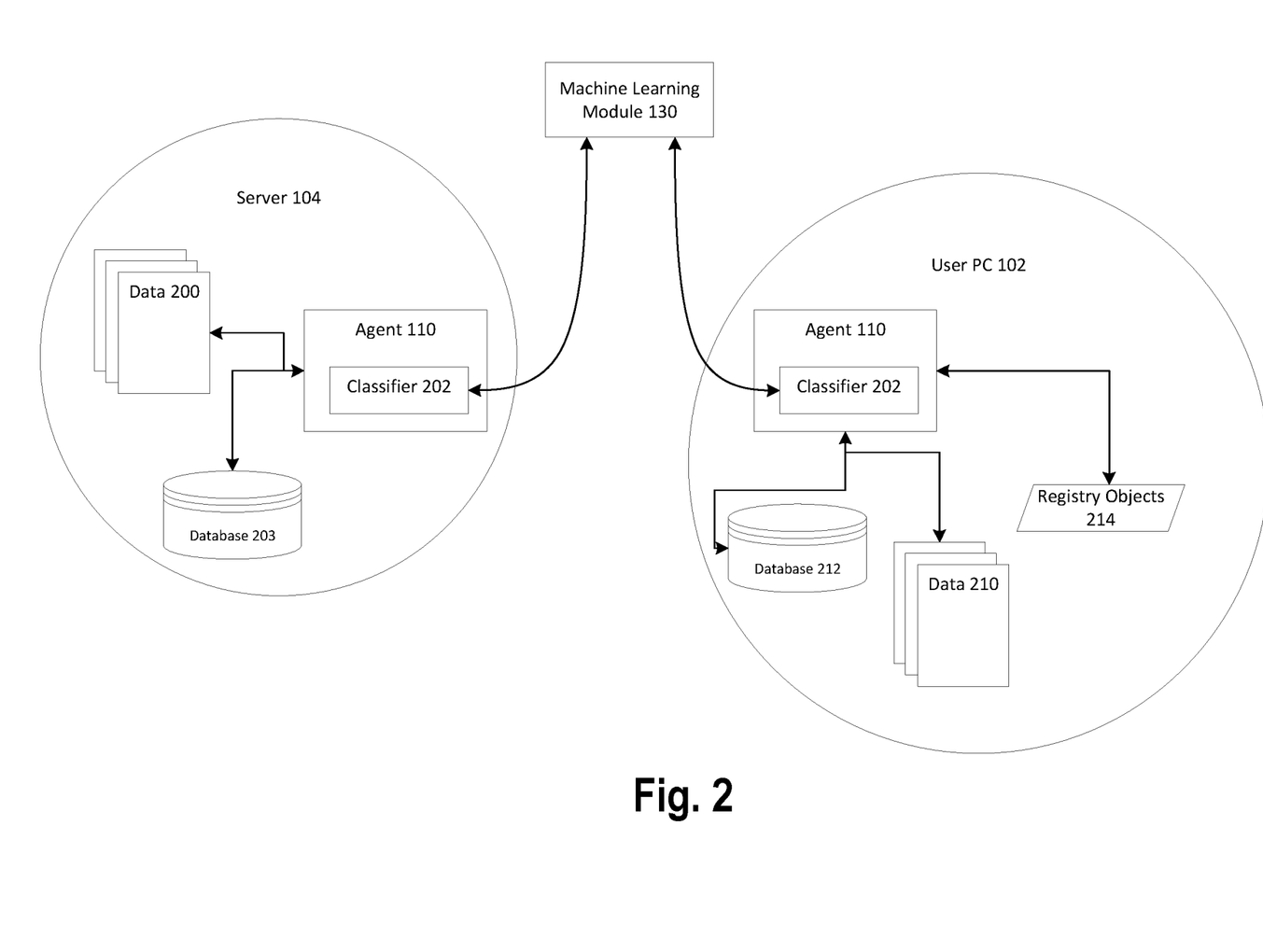
FIG. 2 is a block diagram further illustrating the machine learning module, in accordance with exemplary aspects of the present disclosure.

FIG. 2 is a block diagram further illustrating the machine learning module 130, in accordance with exemplary aspects of the present disclosure.

In some aspects, each endpoint contains a classifier. For example, server 104 and user PC 102 have a classifier 202 installed therein. The classifier 202 utilizes the machine learning module 130 to help classify documents on these devices. The server 104 may have access to (e.g., via remote and/or local storage) data 200 and database 203 while the User PC 102 may have access to database 212, data 210 and registry objects 214, for example. As the agent 110 scans these data sources, the machine learning module 130 helps in classifying each based on a previously trained model of various files and their categories.

In some aspects, a machine learning model comprised in machine learning module 130 may be trained using a dataset of files, where each file is pre-classified into one or more of a plurality of categories based on the respective file's characteristics. The characteristics may be name, size, file location, file contents, fuzzy hash, etc. The categories of data may include the file type (e.g., financial data, personal information, medical data, etc.), the types of policies that should be applied to the data, the encryption expectation for the data, or the like. For example, the training dataset may include a data structure listing the characteristics named above for each training file and a corresponding category classification (e.g., category is "medical data" for a file with data structure ["MRI scan", 10 MB, "database 212/Documents/Medical/", JPEG image, 1234ABCD]). Based on the training, the machine learning module is configured to determine a category for any particular file.

In some aspects, machine learning module 130 parses files (e.g., data 200 and data 210) in order to extract the characteristics listed above. For example, machine learning module 130 may receive a file and may parse the file to generate an input data structure that be utilized by the machine learning algorithm. The generated input data structure may be stored in database 203 and database 212 for server 104's files in data 200 and user PC 102's files in data 210, respectively.

In some aspects, the agent 110 may scan contents of documents on the various devices and perform the parsing independently using classifiers. For example, classifier 202 of user pc 102 may extract the characteristics of data 210 and store the characteristics as an input data structure in database 212. Machine learning module 130 may then access database 212 via classifier 202 to category the files of data 210 based on the data structures stored in database 212.

In a similar fashion, the machine learning module 130 may be utilized by any classifier across the endpoints in FIG. 1 to classify documents or data into various categories. These categories may include a range from confidential documents to public documents. The sensitive data classifier may, in some aspects, accumulate information and transmit the information to a central server where this information is analyzed from different points of view: information leaks, overlap with secret documents (using fuzzy matching) and the like. For example, classifier 202 may define (using, e.g., block hashes) and determine what percentage of the document hash matches with a master document or original document. In some aspects, "fuzzy hashing" technology may be used to compare hashes and determine that two objects are not entirely equal, but have some degree of equivalence. For example, the threshold of fuzzy matching may be predetermined by an administrator to be 75 or 80%, and this can help find content of an original document, whether the document was modified and how it differs from the initial document.

Figure 3:
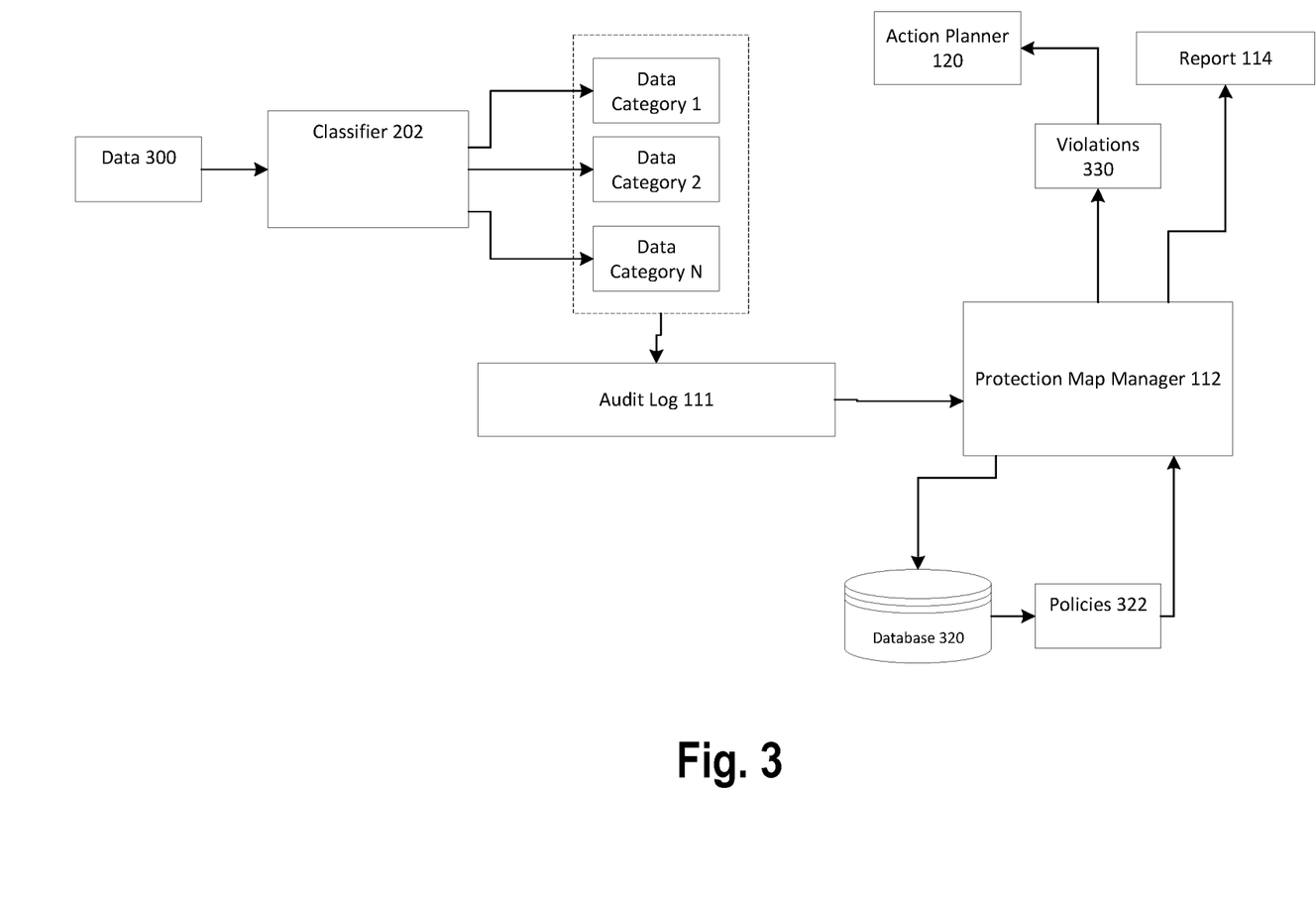
FIG. 3 is a block diagram illustrating the protection map manager, in accordance with exemplary aspects of the present disclosure.

FIG. 3 is a block diagram illustrating the protection map manager 112, in accordance with exemplary aspects of the present disclosure.

As described with respect to FIG. 2, the classifier 202 categorizes data 300 into various data categories 1 to N that are recorded into the audit log 111 by the agent 110. The audit log 111 contains a record of all files that were scanned on all computing devices, and information about these files. The protection map manager 112 receives or requests the audit log 11 containing all the records of the scans. The protection map manager 112 also receives a set of policies 322 from, for example, a database 320. The set of policies 322 is the standards that an administrator has decided to apply to the enterprise endpoints/storage facilities. These policies 322 include internal confidentiality policies, external policies, in addition to legal regulations and the like that dictate how particular categories of data (such as identifying documents or financial documents and the like) should be stored.

The protection map manager 112 compares the entries in the audit log 11 to the policies 322 to determine violations 330 and the files that do not comply with the policies 322. The comparison may involve a determination of whether a particular data category is stored in a proper location, has encryption enabled, contains identifying information, or the like. Violations 330 identify files that do not comply with the policies 322 and also how these files do not comply. For example, a policy of policies 322 may require that medical files be stored in a particular drive that is protected by encryption. In response to determining that a file classified as a medical file is not stored in the particular drive, protection map manager 112 may identify a violation by that file. The protection map manager 112 also generates a report 114 highlighting the components of the system 100 and the violations 330 therein. The report 114 may also be, as shown in FIG. 1, further visualized as compliance map 116 which highlights various portions of the system 100 and what policy those portions violate. In some aspects, the visualization map may be interactive and an administrator can activate portions of the map to view further details on compliance efficiently and in an organized manner. The visualization map 116 also permits administrators to easily identify non-compliant devices in a group, sub-group or sub-networks of an enterprise, network or the like, and the policies they are not compliant with. This additional interactivity improves function of the computing devices across the enterprise by identifying vulnerabilities and non-compliance quickly and efficiently.

Figure 4:
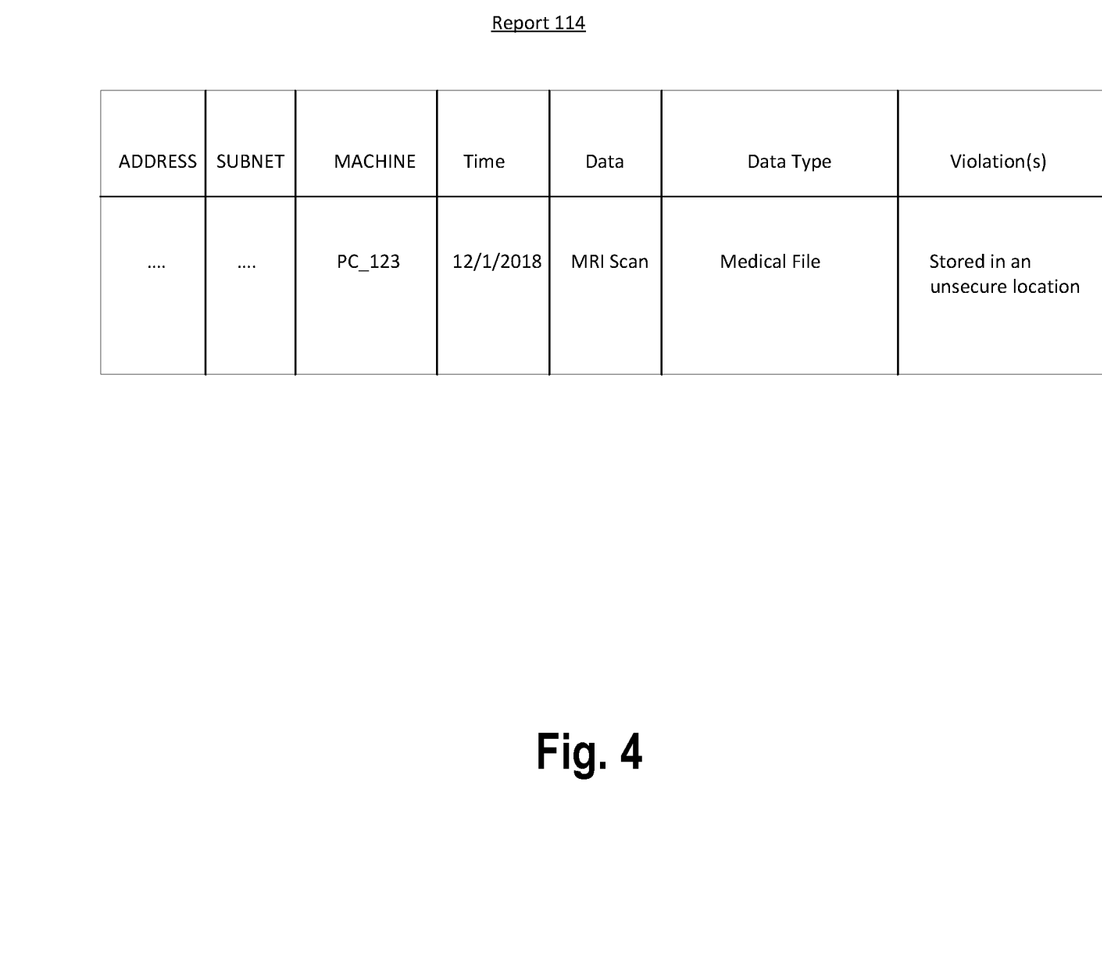
FIG. 4 illustrates an exemplary report structure, in accordance with exemplary aspects of the present disclosure.

As shown in FIG. 4, the report 114 may comprise various pieces of information regarding data content. In one aspect, the report can include the following fields:

IP
Subnet
Machine (Machine ID)
Date
Time
Data (document type and file name)
Data Type (the category to which this data type belongs, for example, Marketing)
Additional information about other parameters of a document can be provided, like data severity, business value, author of the document, etc.)
Violations
Access Policy Rights (which users or user groups have access to this document)

Following the overarching example described in the previous figures, the report 114 identifies an MRI scan that has been classified by machine learning module 130 as a medical file and that violates a policy listed in policies 322.

Figure 5:
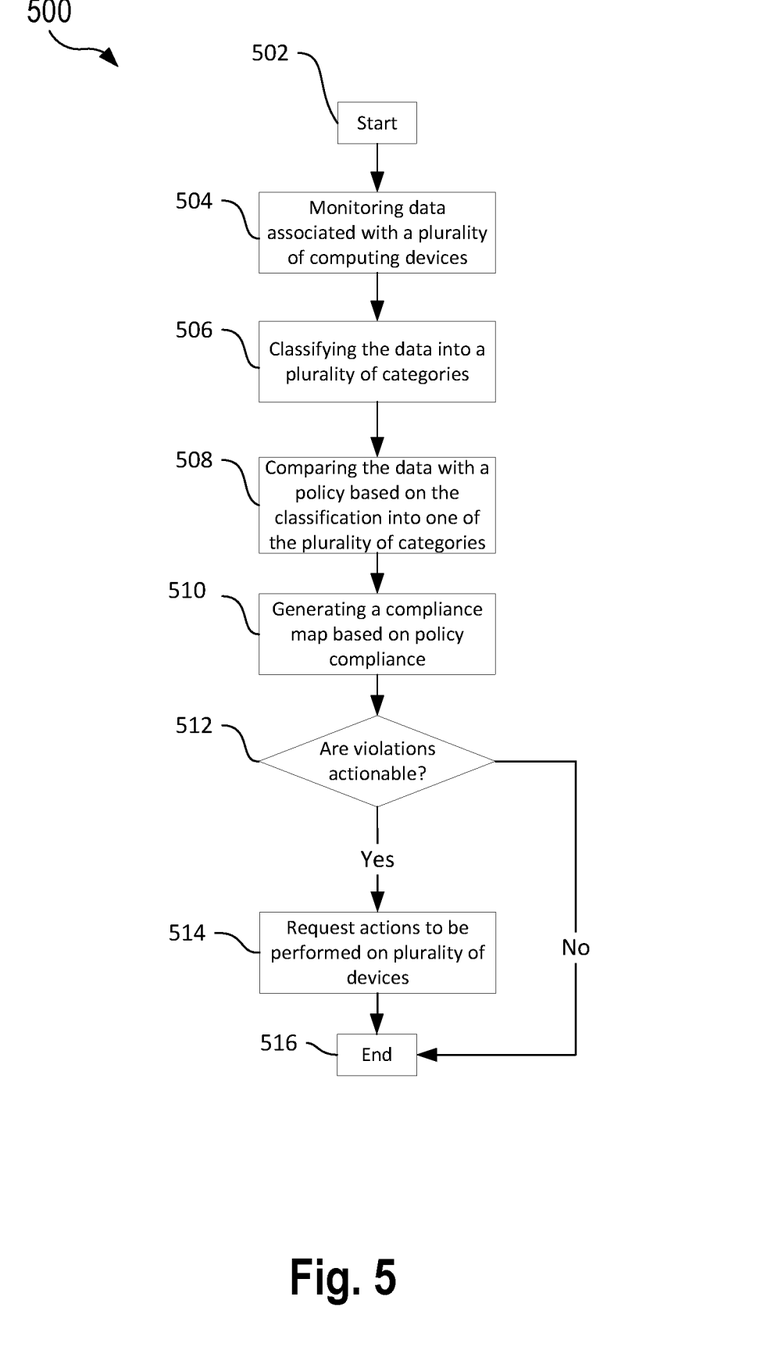
FIG. 5 is a flowchart illustrating a method for remediation of vulnerabilities, in accordance with exemplary aspects of the present disclosure.

FIG. 5 is a flowchart illustrating a method for remediation of vulnerabilities, in accordance with exemplary aspects of the present disclosure.

The method begins at 502 and proceeds to 504. At 504, agents on computing devices across an enterprise, network, or group of computers, monitor data at each of the devices by scanning contents of the data and other metadata related to the data such as file types, creation dates, edit dates and the like.

The method 500 then proceeds to 506, where the data is classified into a plurality of categories using a classifier, either located at each computing device, or in a centralized location where the data is received and processed. In some aspects, the classifier is assisted by a machine learning engine that improves classification of data over time as more data is collected. The categories of data may include the types of the file, the contents of the file, the types of policies that should be applied to the data, the encryption expectation for the data or the like.

An audit log is generated based on the scans performed by the agents and on the classifications performed by the classifiers.

This audit log is received at or requested by the protection map manager 112 (shown in FIG. 1) in step 508. At 508, the protection map manager iterates through each entry and compares the entries with various data policies based on the classifications of the data into categories. Each set of data policies may be organized in accordance with the category that they are relevant for. For instance, data that has been determined to contain personal identifying info may be compared to policies that dictate the encryption schemes and protection controls for personal identifying data. Similarly, data that contains credit card details may be compared to the same policy, in addition to other policies regulating exposure of financial data. The data policies may be accessed by the protection map manager via a database that organizes all of the policies as described above.

As the method proceeds to 510, a report and additionally a compliance map may be generated based on the comparison by the protection map manager (i.e., the compliance with policies for each respective data file of the monitored data). The report may be in textual format, or held in memory in a data structure, but not limited thereto. The report can be permanent, or it can be created on demand, depending on the goals of the compliance system and policy. The compliance map indicates the vulnerabilities (used interchangeably with violations) on the plurality of computing devices.

The compliance map is a visualization of the compliance across an enterprise, showing particular devices that do not comply with policies, which policies they do not comply with, the particular data that is non-compliant, the levels of compliance for particular subnets or networks of the enterprise and optionally an index for identifying the range of compliance.

The method 500 then proceeds to 512 where the protection map manager determines whether the violations of policy indicated in the compliance map are actionable. In some aspects, actionable refers to those violations that can be corrected through system configuration, relocation of files, encrypting files, or any other computer-executed action that can correct the vulnerabilities. For example, if a medical file is in an improper location, protection map manager may determine that the violation can be resolved if the medical file is moved to an appropriate location. If the violations are not actionable, the method 500 ends at 516. Otherwise, the method proceeds to 514 where the protection map manager 112 requests actions to be performed on the plurality of devices to correct the violations that are actionable and correctable. In some aspects, protection map manager 112 may automatically resolve the violation. For example, protection map manager 112 may shift the medical file from its current location to a correct location. The method then ends at 516.

Figure 6:
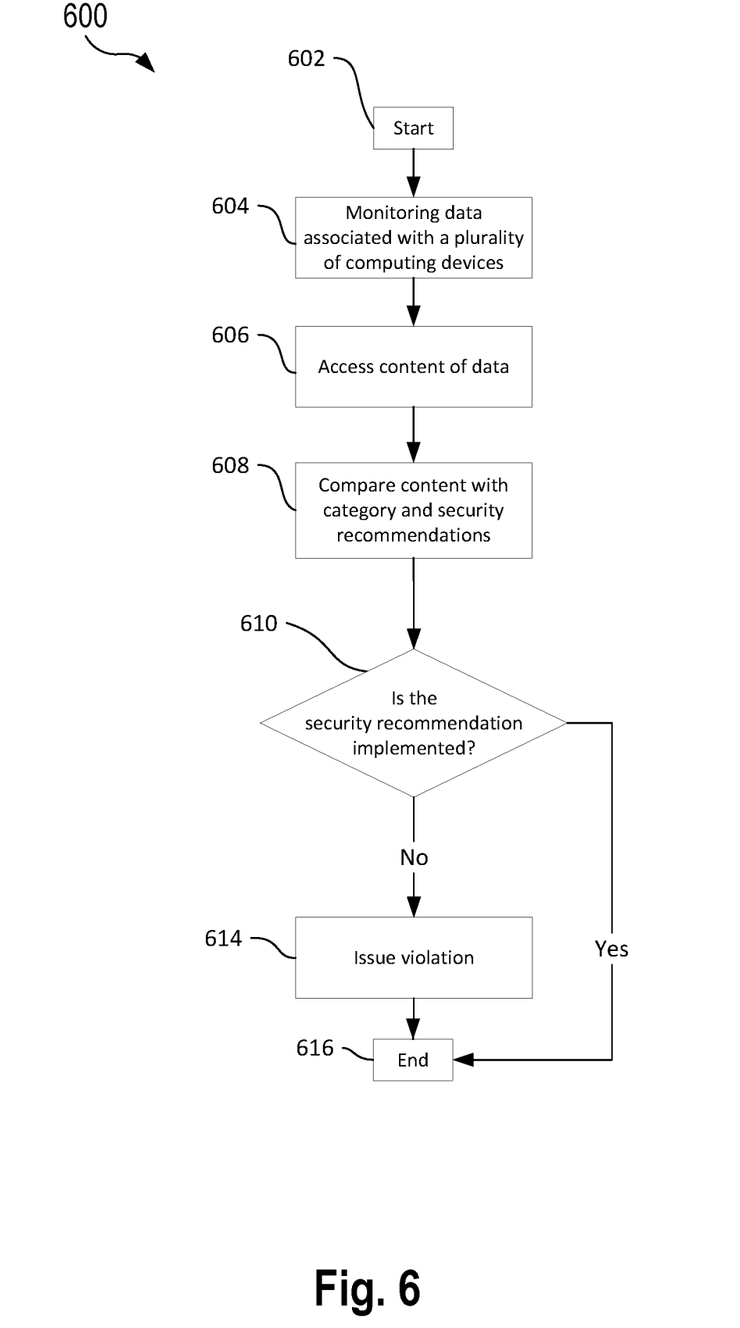
FIG. 6 is a flowchart illustrating a method for determining violations of security policies, in accordance with exemplary aspects of the present disclosure.

FIG. 6 is a flowchart illustrating a method for determining violations of security policies, in accordance with exemplary aspects of the present disclosure.

The method begins at 602 and proceeds to 604.

At 604, an agent associated with each of the plurality of computing devices monitors data associated with the respective computing device. In some aspects, one agent may monitor one computing device, or one agent may be assigned to monitor several computing devices.

At 606, the agent accesses the content of the data by reading the file.

At 608, the protection map manager compares the content of the data with the category of the data and security recommendations for that category. For example, the data may be an MRI scan with category "medical file." The agent may refer to a database that lists security recommendations for a plurality of categories including "medical file." The security recommendations may include, but are not limited to, encryption settings (e.g., which settings to implement), access settings (e.g., which users and/or devices can access the file), network restrictions (e.g., in which network settings access ceases), etc. The protection map manager specifically determines whether the security recommendations are currently being implemented.

If at 610, the data content does not match those security recommendations (i.e., the recommendations are not being implemented), then the method proceeds to 614 where the protection map manager issues a violation. All such violations are compiled into a report and into the compliance visualization by the protection map manager. The method proceeds to terminate at 616.

Figure 7:
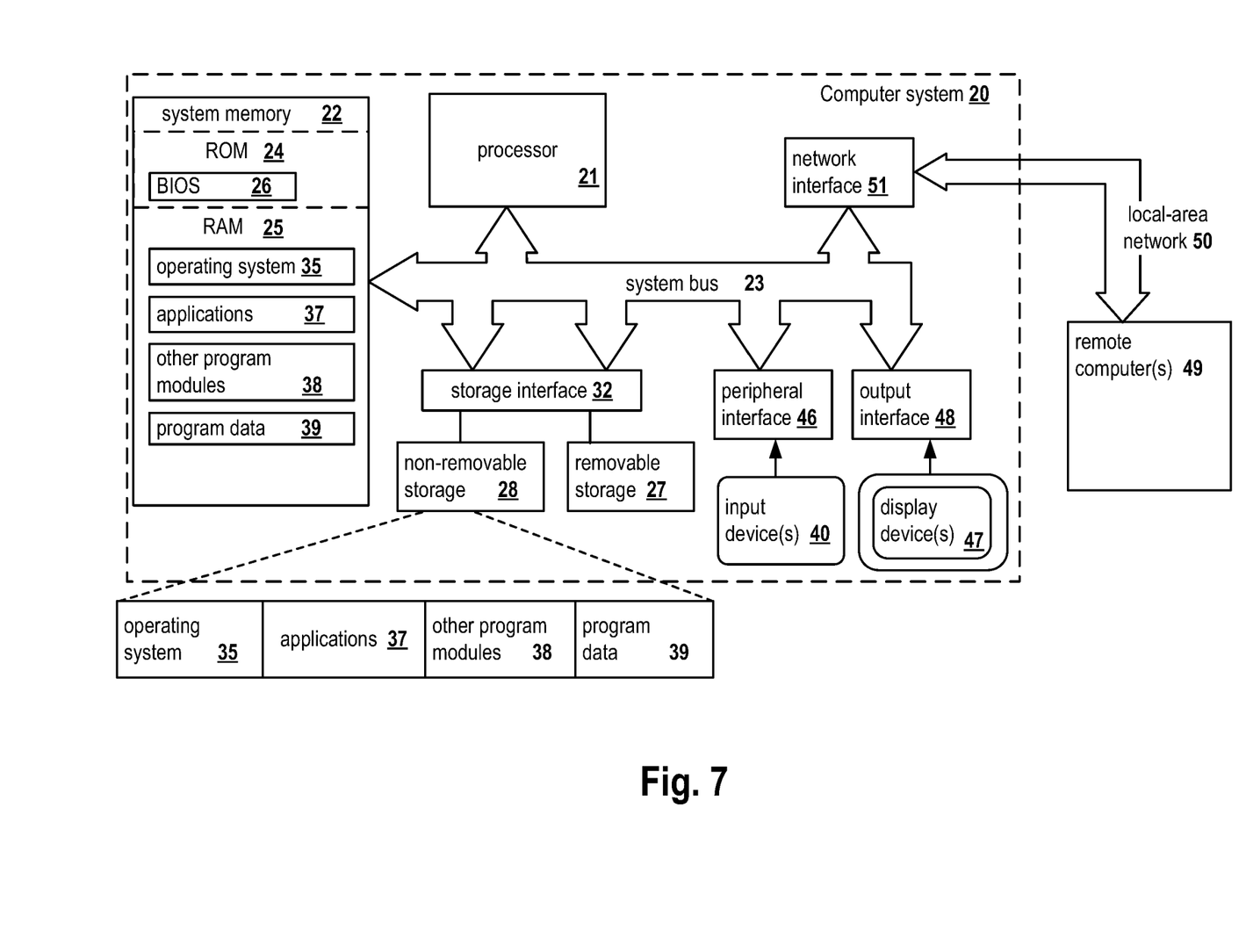
FIG. 7 is a block diagram of a computer system on which the disclosed system and method can be implemented according to an exemplary aspect.

FIG. 7 is a block diagram illustrating a computer system 20 on which aspects of systems and methods for generating a protection map and remediating vulnerabilities may be implemented in accordance with an exemplary aspect. It should be noted that the computer system 20 can correspond to the any components of the system 100, for example endpoints 1-N, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for remediating vulnerabilities on a plurality of computing devices, comprising:
    monitoring data associated with the plurality of computing devices;
    classifying the monitored data into a plurality of categories using a machine learning algorithm configured to assign a category for a data file based on characteristics of the data file;
    for each respective data file of the monitored data, evaluating compliance by:
        retrieving one or more policies associated with a respective category of the respective data file; and
        determining whether respective data file complies with the one or more policies;
    generating a compliance map based on the compliance with policies for each respective data file of the monitored data, wherein the compliance map indicates the vulnerabilities on the plurality of computing devices;
    determining whether the vulnerabilities indicated in the compliance map are actionable; and
    in response to determining the vulnerabilities are actionable, requesting actions to be performed on the plurality of devices to remediate the vulnerabilities and non-compliance.

2. The method of claim 1, wherein determining whether the vulnerabilities are actionable comprises:
    determining that the vulnerabilities can be corrected using automated processes executed on a computing device.

3. The method of claim 1, wherein the actions comprise one or more of moving data to a secure storage area, changing access rights to data and making an urgent backup of data.

4. The method of claim 1, wherein classifying the data comprises:
    grouping the data into categories based on one of a file type of the data, content of the data, and a logical grouping of the data.

5. The method of claim 1, further comprising:
    generating an audit log during monitoring of the data associated with the plurality of computing devices;
    generating a report of compliance of the data based on the audit log; and
    generating the compliance map based on the report.

6. The method of claim 1, further comprising:
    displaying the compliance map to an end user;
    detecting end user input on the compliance map;
    determining that the end user input has selected a portion of the plurality of computing devices by determining if the end user input coincides with a visual depiction of the portion of the plurality of computing devices;
    and providing detailed information regarding compliance of the portion of the plurality of the computing devices.

7. A system for remediating vulnerabilities on a plurality of computing devices, the system comprising:
    a processor configured to:
        monitor data associated with the plurality of computing devices;
        classify the monitored data into a plurality of categories using a machine learning algorithm configured to assign a category for a data file based on characteristics of the data file;
        for each respective data file of the monitored data, evaluating compliance by:

retrieving one or more policies associated with a respective category of the respective data file; and determining whether respective data file complies with the one or more policies;

generate a compliance map based on the compliance with policies for each respective data file of the monitored data, wherein the compliance map indicates the vulnerabilities on the plurality of computing devices;

determine whether the vulnerabilities indicated in the compliance map are actionable; and in response to determining the vulnerabilities are actionable, request actions to be performed on the plurality of devices to remediate the vulnerabilities and non-compliance.

8. The system of claim 7, wherein the processor is configured to determine whether the vulnerabilities are actionable by:

determining that the vulnerabilities can be corrected using automated processes executed on a computing device.

9. The system of claim 7, wherein the actions comprise one or more of moving data to a secure storage area, changing access rights to data and making an urgent backup of data.

10. The system of claim 7, wherein the processor is configured to classify the data by:

grouping the data into categories based on one of a file type of the data, content of the data, and a logical grouping of the data.

11. The system of claim 7, wherein the processor is further configured to:

generate an audit log during monitoring of the data associated with the plurality of computing devices;

generate a report of compliance of the data based on the audit log; and generate the compliance map based on the report.

12. The system of claim 7, wherein the processor is further configured to:

display the compliance map to an end user;

detect end user input on the compliance map;

determine that the end user input has selected a portion of the plurality of computing devices by determining if the end user input coincides with a visual depiction of the portion of the plurality of computing devices;

and provide detailed information regarding compliance of the portion of the plurality of the computing devices.

13. A non-transitory computer readable medium storing thereon computer executable instructions for remediating vulnerabilities on a plurality of computing devices, comprising instructions for:

monitoring data associated with the plurality of computing devices;

classifying the monitored data into a plurality of categories using a machine learning algorithm configured to assign a category for a data file based on characteristics of the data file;

for each respective data file of the monitored data, evaluating compliance by:

retrieving one or more policies associated with a respective category of the respective data file; and determining whether respective data file complies with the one or more policies;

generating a compliance map based on the compliance with policies for each respective data file of the monitored data, wherein the compliance map indicates the vulnerabilities on the plurality of computing devices;

determining whether the vulnerabilities indicated in the compliance map are actionable; and in response to determining the vulnerabilities are actionable, requesting actions to be performed on the plurality of devices to remediate the vulnerabilities and non-compliance.

14. The non-transitory computer readable medium of claim 13, wherein the instruction for determining whether the vulnerabilities are actionable further comprises an instruction for:

determining that the vulnerabilities can be corrected using automated processes executed on a computing device.

15. The non-transitory computer readable medium of claim 13, wherein the actions comprise one or more of moving data to a secure storage area, changing access rights to data and making an urgent backup of data.

16. The non-transitory computer readable medium of claim 13, wherein the instruction for classifying the data comprises an instruction for:

grouping the data into categories based on one of a file type of the data, content of the data, and a logical grouping of the data.

17. The non-transitory computer readable medium of claim 13, further comprising instructions for:

generating an audit log during monitoring of the data associated with the plurality of computing devices;

generating a report of compliance of the data based on the audit log; and generating the compliance map based on the report.

18. The non-transitory computer readable medium of claim 13, further comprising instructions for:

displaying the compliance map to an end user;

detecting end user input on the compliance map;

determining that the end user input has selected a portion of the plurality of computing devices by determining if the end user input coincides with a visual depiction of the portion of the plurality of computing devices;

and providing detailed information regarding compliance of the portion of the plurality of the computing devices.

* * * * *